March 21, 1939.  L. VITOLO  2,151,668

HALF FRAME MOUNTING FOR EYEGLASSES

Filed June 4, 1938

INVENTOR
L. Vitolo
BY B Joffe
his ATTORNEY

Patented Mar. 21, 1939

2,151,668

UNITED STATES PATENT OFFICE 2,151,668

HALF FRAME MOUNTING FOR EYEGLASSES

Louis Vitolo, New York, N. Y., assignor to Century Oxford Manufacturing Corp., Brooklyn, N. Y.

Application June 4, 1938, Serial No. 211,853

1 Claim. (Cl. 88—47)

My invention relates to eyeglasses of the half-frame type and has reference more particularly to the means in the frame for anchoring the lenses thereto.

The object of the invention is to provide an unflexible half-frame section for glasses in which the anchoring means are formed of tongues or lugs punched out from the frame and adapted to engage notches provided in the lenses.

Another object of the invention is to provide the lugs or tongues so that their engagement with the notches of the lens tends to maintain the lens in the frame.

In the appended drawing forming part of this application, Figure 1 is a section on line 1—1, Figure 2.

Figure 1:
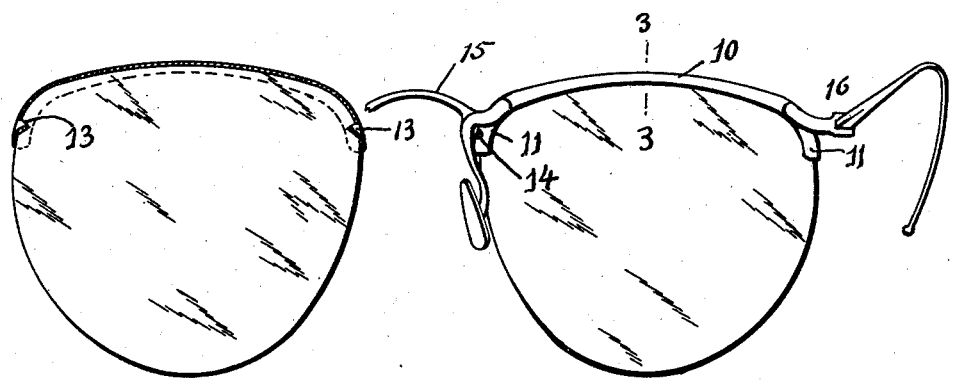
Figure 2:
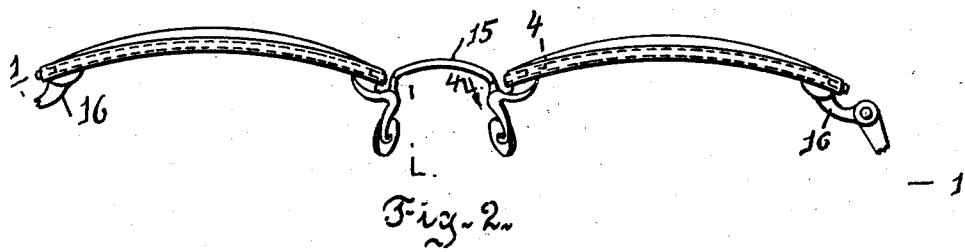
Figure 2 is a top plan of the eyeglass.
Figure 3:
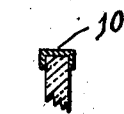
Figure 3 is a fragmentary section on line 3—3, Figure 1.
Figure 5:
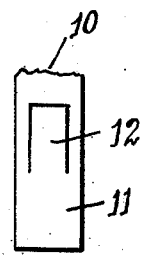
Figure 5 is a fragmentary elevation of the end of the frame wherein the tongue is punched out for engaging the lens.

The half-frame mounting has two channelled members 10 shaped to conform to the portion of the lens it is to receive. In view of its channelled cross-section, the frame section is substantially non-flexible in either plane. As shown, the channelled member 10 fits the upper arcuated edge of the lens, and in conformity with the lens has downward extending channelled sections 11, preferably having slightly larger sides than the frame has in its central part.

These sections 11 of the channelled members 10 each are provided in the bottom of the channel with a punched-out tongue or lug 12, the anchored part of which tongue in the corresponding frame section 11 is nearer to the end of said section. Therefore, the free end of the lug or tongue is remote from the end of the corresponding section 11.

For each of said tongues 12 of the channelled members 10, the lens fitting the channelled member has spaced V-shaped corresponding notches 13 into which the tongues 12 may be bent to lock the lens in the channelled member 10. These notches 13 are so formed that in normal position of the lenses the horizontal line passing through the apex of the notch forms an angle of about 15 degrees with the upper side of the notch, and about 30 to 35 degrees with the lower side of the notch (see Figure 4), so that the total angle of the notch is between 45 and 50 degrees. Preferably, one of the tongues 12 of a channelled member 10 is pre-bent to engage properly the notch of the lens. The other tongue 12 of the same channelled member 10, preferably the one located nearer to the nose-piece, is only punched out to be bent when the lens is inserted into the channelled member 10.

In inserting a lens into the channelled member 10, one of the notches is made to engage with the pre-bent tongue, so that it could then be swung into the frame until it is fully engaged therein. The other tongue 12 can then be bent into the proximate notch, thereby locking the lens in the channelled member 10.

The two channelled members 10 are united by a nose bridge piece 15, preferably securing said channelled members 10 on the sides of the channel which are disposed toward the eyes when the glasses are worn. Similarly, the bow supporting members 16 are secured to the remote ends of the channelled members 10, also on the sides of the channels disposed towards the eyes of the wearer.

In view of the relative rigidity of the frame 10, the lens engaged by the tongues 12 is firmly locked in the frame and the engagement of the notches 13 with the tongues resist any downward movement of the lens, for the tongues being rigid at a point below the apex of the notch cannot move down with the lens, the frame being unflexible as previously remarked.

Figure 4:
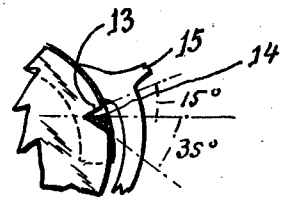
Figure 4 is a fragmentary section on line 4—4, Figure 2.

To permit removal of a lens from a channelled member 10, it is necessary to disengage one of the tongues 12 from the corresponding notch 13. For that purpose, I provide an opening 14 in the side of a channel in proximity of said tongue, as best shown in Figures 1 and 4, through which a sharp pointed instrument may be inserted to engage the tongue in the notch and force it out therefrom.

In view of the type of material used for the frames, this operation with the tongue could be performed a large number of times without danger of breaking the tongue off, thus providing means for replacing lenses or changing frames, as the case may be.

I claim:

In a half-frame mounting for eyeglasses including a pair of lens each presenting an arcuated edge at the top with spaced V-notches in said edge, the upper side of said V-notches forming an angle of about 15 degrees with the horizontal passing through the apex of the V in the normal position of the glasses, a channelled member for each lens fitting the arcuated edge and enclosing the notches, a nose-piece bridge securing said two channelled members by engaging the side of the channels adapted to be disposed toward the eyeside of the lenses, bow carrying members at the end of the channelled members remote from the nose-piece and also secured to the side of the channel to which the nose-piece is secured, tongues sheared from the bottom of each of the channelled members and adapted to be bent to engage the notches of the lens for locking the lens in the corresponding channelled members, each of said channelled members having an aperture in the side of the channel in proximity of the tongue for admitting a tool to engage the tongue.

LOUIS VITOLO.